(12) United States Patent
Pashnik et al.

(10) Patent No.: US 7,494,439 B2
(45) Date of Patent: Feb. 24, 2009

(54) DUAL DRIVE PUMP WITH DUAL CHAIN AND ROLLER CLUTCH AND METHOD

(75) Inventors: Richard A. Pashnik, Saline, MI (US); John A. Diemer, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 293 days.

(21) Appl. No.: 11/171,121

(22) Filed: Jun. 30, 2005

(65) Prior Publication Data

US 2006/0054445 A1 Mar. 16, 2006

Related U.S. Application Data

(60) Provisional application No. 60/604,818, filed on Aug. 26, 2004.

(51) Int. Cl.
*F16H 57/04* (2006.01)
*F04B 49/00* (2006.01)

(52) U.S. Cl. ......................................... 475/159; 417/16

(58) Field of Classification Search ...................... 475/4, 475/8, 159; 180/65.2; 417/16, 17
See application file for complete search history.

(56) References Cited

U.S. PATENT DOCUMENTS

| 5,279,399 | A | | 1/1994 | Riggle | 192/45 |
|---|---|---|---|---|---|
| 5,474,428 | A | * | 12/1995 | Kimura et al. | 417/16 |
| 5,799,744 | A | * | 9/1998 | Yamaguchi et al. | 180/65.2 |
| 5,823,282 | A | | 10/1998 | Yamaguchi | 180/65.2 |
| 5,993,169 | A | | 11/1999 | Adachi et al. | |
| 6,253,137 | B1 | * | 6/2001 | Abo et al. | 701/51 |
| 6,575,865 | B2 | * | 6/2003 | Takenaka et al. | 475/5 |
| 6,863,140 | B2 | * | 3/2005 | Noreikat et al. | 180/65.2 |
| 6,964,631 | B2 | * | 11/2005 | Moses et al. | 477/3 |
| 2004/0072641 | A1 | | 4/2004 | Nakamura | |
| 2004/0112654 | A1 | | 6/2004 | Kozarekar et al. | |

FOREIGN PATENT DOCUMENTS

| DE | 3619577 | 12/1987 |
|---|---|---|
| DE | 19727058 | 2/1998 |
| DE | 19810374 | 9/1999 |
| JP | 2001177908 | 6/2001 |

\* cited by examiner

*Primary Examiner*—Tisha D Lewis

(57) ABSTRACT

A pumping system for a transmission system having a single pump functionally connected to a mechanical power source and an electrical power source is provided. The connections between the pump and the mechanical power source and electrical power source include at least one roller clutch, which permits only one of the power sources to drive the pump at any given time. Additionally, the functional connections, which may be chains, provide that the pump and the electrical power source may be located non-coaxial with the center axis of the transmission system, as may be preferred for improved packaging. The dual-chain and roller clutch pumping system is appropriate for gasoline/electric hybrid vehicles where pumping may be necessary when the engine is off and limited packaging space is available in the transmission housing.

18 Claims, 2 Drawing Sheets

DUAL DRIVE PUMP WITH DUAL CHAIN AND ROLLER CLUTCH AND METHOD

CROSS-REFERENCE TO RELATED APPLICATION

This application claims the benefit of U.S. Provisional Application 60/604,818 filed Aug. 26, 2004, which is hereby incorporated by reference in its entirety.

TECHNICAL FIELD

This invention relates to a pumping system for a hybrid vehicle transmission system having a single pump with dual chains and a roller clutch.

BACKGROUND OF THE INVENTION

A vehicle transmission system is equipped with a pump to supply fluid to power vehicle clutches as well as to provide lubrication and cooling to the transmission systems. The vehicle engine provides power to a pump in many previous pumping systems and, thus, the systems are only operable when the engine is running. In these previous systems, there is no mechanical ability to run the hydraulic pump when the engine is not running. However, situations exist where the engine is off but vehicle mechanisms are in motion, such as when a battery powers an electric/gasoline hybrid vehicle. Another previous method to provide pumping when the engine is not running is to include a separate pump for each power source rather than a single pump operable by multiple power sources. For example, in a multi-pump system for a hybrid gasoline/electric vehicle, when the engine is running, a first pump operates to drive fluid through the system and a second pump is inoperable, but when the vehicle is electrically powered the first pump is inoperable and the second pump operates. This solution, however, requires more packaging space than a conventional one-pump system because of the additional pump or pumps required. There is a need for a vehicle pumping system that operates both when the engine is running and when the vehicle is powered by other power sources, such as an electric battery or electric motor, while also maintaining or improving the system packaging requirements.

An electromechanical transmission is described in commonly assigned U.S. patent application Ser. No. 11/071,406 entitled "Electrically Variable Transmission with Selective Fixed Ratio Operation," Holmes et al., filed Mar. 3, 2005 and is hereby incorporated by reference in its entirety.

SUMMARY OF THE INVENTION

The pumping system of the present invention is a dually-powered pump with dual chains and a roller clutch. The system provides fluid pressure in a transmission system of a vehicle powerable by more than one power source, such as a gasoline/ electric hybrid. The pump is adapted to receive power from either a mechanical power source, such as the vehicle's engine (which may be an internal combustion engine), or an electrical power source, which may be an electric motor or battery, depending upon whether the vehicle is being powered mechanically or electrically. The pump is functionally connected to both the mechanical power source and the electrical power source by chains or the like. A roller clutch provides that only one of the connections between the pump and the mechanical power source or electrical power source is functional at any time and only one of the mechanical power source or electrical power source may drive the pump at any time. Such a pumping system requires only one pump for vehicles powerable by multiple energy sources. The dual chains provide that the pump may be situated off-axis, as may be more convenient for packaging purposes and may reduce transmission axial length. Thus, a pump or a method of pumping utilizing an input connection such as a chain permits the electric motor to be housed non-coaxial with the center axis to improve packaging.

The present invention includes a pumping system adapted for use in a transmission system of a vehicle having a mechanical power source, a first electrical power source, and a second electrical power source. The pumping system includes a pump, a first connection apparatus, and a second connection apparatus. The pump is functionally connected to the mechanical power source via the first connection apparatus and the pump is functionally connected to the second electrical power source via the second connection apparatus. The pump is powerable by the mechanical power source when the vehicle is powered by the mechanical power source and the pump is powerable by the second electrical power source when the vehicle is powered by the first electrical power source.

The present invention includes a pump adapted for use in a transmission system of a vehicle. The pump has a first functional connection to a mechanical power source and a second functional connection to an electrical power source. The pump is powerable by the mechanical power source independent of the electrical power source and the pump is powerable by the electrical power source independent of the mechanical power source.

The present invention also provides a method of pumping fluid in a transmission system of a vehicle having a mechanical power source and a first electrical power source. The method includes the steps of functionally connecting a pump to the mechanical power source and functionally connecting the pump to a second electrical power source. The method further includes providing power to the pump from the mechanical power source when the vehicle is powered by the mechanical power source and restricting power to the pump from the second electrical power source when the vehicle is powered by the mechanical power source. The method also includes providing power to the pump from the second electrical power source when the vehicle is powered by the first electrical power source and restricting power to the pump from the mechanical power source when the vehicle is powered by the first electrical power source.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
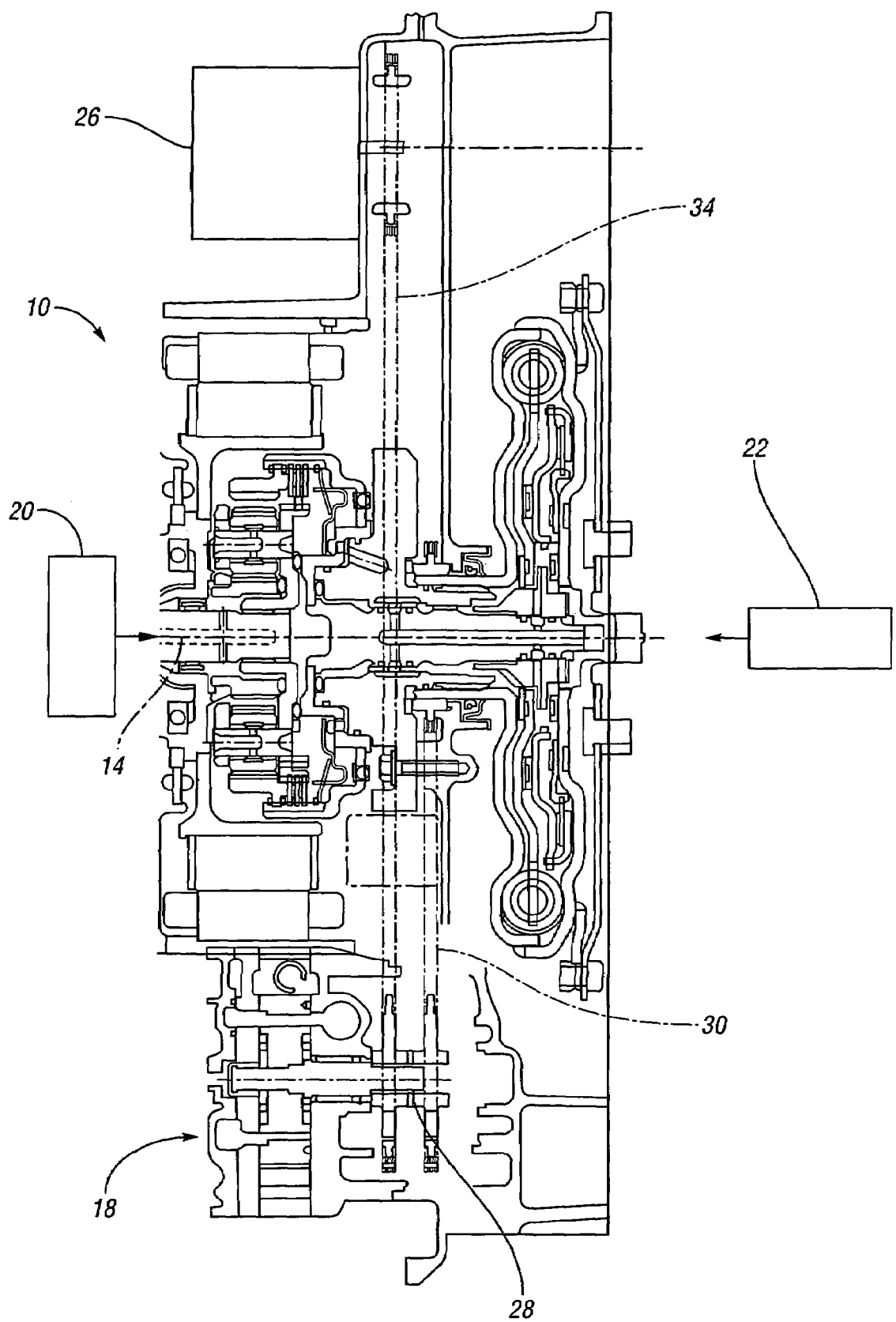
FIG. 1 is a fragmentary cross-sectional side view of the transmission in accordance with the present invention.
Figure 2:
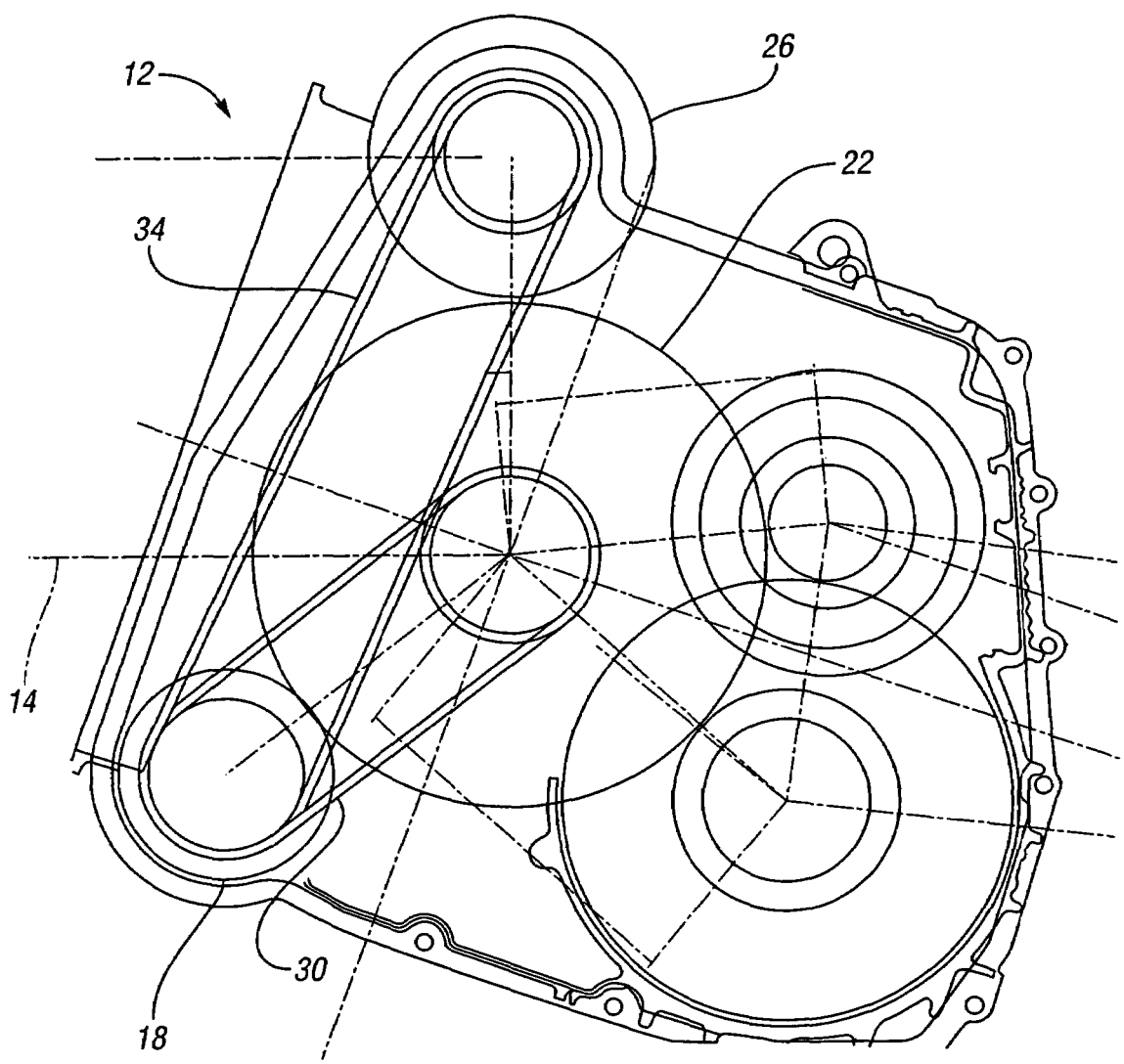
FIG. 2 is a fragmentary cross-sectional end view of the pumping system in accordance with the present invention.

FIG. 1 illustrates a transmission system 10 of a gasoline/electric vehicle having a center axis 14. FIG. 2 is a representation of the pumping system 12 of the transmission system 10 of FIG. 1. Referring to FIGS. 1 and 2, the pumping system 12 comprises a pump 18 that supplies fluid to power the vehicle clutches as well as providing cooling and lubrication to the transmission systems. The pump 18 is functionally connected to the first mechanical power source or engine 22 and a second electrical power source or electric motor 26 by a first connection apparatus 30 and a second connection apparatus 34, respectively. The functional connections through the first and second connection apparatuses 30, 34 may provide power to the pump 18 either directly from each power source 22, 26 or transferred through devices such as belts or chains, as illustrated in FIG. 2. The connections between the pump 18 and the engine 22 and between the pump 18 and the electric motor 26 include a pair of one-way roller clutches 28, which permit only one of the engine 22 and the electric motor 26 to drive the pump 18 at any time. The roller clutch 28 prevents the engine 22 and the electric motor 26 from simultaneously attempting to drive the pump 18, which could waste energy and increase wear on vehicle systems. Thus, when the engine 22 powers the vehicle, the engine 22 drives the pump 18 through the first chain (or first connection apparatus) 30 and the electric motor 26 does not provide power to the pump 18 and may freewheel. Similarly, when the first electric power source 20 powers the vehicle, the electric motor 26 drives the pumping system 12 through the second chain 34 and the engine 22 does not provide power to the pump 18 and may freewheel. The first electric power source 20 is coaxial with the engine 22 along the center axis 14.

The pumping system 12 of the present invention provides pressurized fluid, such as oil, when the gasoline/electric vehicle is powered by either the engine 22 or the first electrical power source 20 without requiring an additional pump. The use of the first and second connection apparatuses 30, 34 allows the pump 18 and the electric motor 26 to be housed non-coaxial with the center axis 14, which provides for improved packaging length within the transmission system 10. Placing the electric motor 26 on the same axis as the pump 18 or the engine 22 may increase the packaging space needed for the transmission housing, whereas placing the electric motor 26 off-axis and connecting it to the pump 18 with the second connection apparatus 34, such as a chain, keeps the packaging space requirements to a minimum.

A pumping system 12 adapted for use in a transmission of a gasoline/electric vehicle having a mechanical power source 22, such as an internal combustion engine, and a first electrical power source 20, such as an electric motor, is provided. The first electrical power source may be a motor/generator such as those described in commonly owned U.S. Provisional Application 60/591,748, entitled "Motor Cooling System" filed Jul. 28, 2004, hereby incorporated by reference in its entirety, which discloses additional details regarding the transmission system 10 in which the present invention is implemented. The pumping system 12 has a pump 18 functionally connected to the mechanical power source 22 by a first connection apparatus 30 and functionally connected to a second electrical power source 26, such as an electric motor, by a second connection apparatus 34. A roller clutch 28 is present at the connections between each of the mechanical power source 22 and second electrical power source 26 and the pump 18. The roller clutch 28 provides that only one of the mechanical power source 22 and second electrical power source 26 may supply power to the pump 18 at any time. When the vehicle is powered by the mechanical power source 22 the pump 18 is powered by the mechanical power source 22. When the vehicle is powered by the first electrical power source 20, the pump 18 is powered by the second electrical power source 26.

The improved pumping system is also embodied in a method for pumping fluid in a transmission system 10 of a gasoline/electric vehicle powerable by a mechanical power source 22, such as an internal combustion engine, and a first electrical power source 20, such as an electric motor. The method comprises functionally connecting a pump 18 to the mechanical power source 22 and a second electrical power source 26, which may be an electric motor. When the vehicle is powered by the mechanical power source 22, the mechanical power source 22 supplies power to the pump 18 and power from the second electrical power source 26 is restricted from the pump 18. When the vehicle is powered by the first electrical power source 20, the second electrical power source 26 supplies power to the pump 18 and power from the mechanical power source 22 is restricted from the pump 18.

While the best modes for carrying out the invention have been described in detail, those familiar with the art to which this invention relates will recognize various alternative designs and embodiments for practicing the invention within the scope of the appended claims.

The invention claimed is:

1. A pumping system adapted for use in a transmission system of a vehicle having a mechanical power source, a first electrical power source, and a second electrical power source, said pumping system comprising:
   a pump;
   a first connection apparatus; and
   a second connection apparatus;
   wherein said pump is functionally connected to the mechanical power source via said first connection apparatus;
   wherein said pump is functionally connected to the second electrical power source via said second connection apparatus;
   wherein said pump is powerable by the mechanical power source and not powerable by the second electrical power source when the vehicle is powered by the mechanical power source;
   wherein said pump is powerable by the second electrical power source and not powerable by the mechanical power source when the vehicle is powered by the first electrical power source; and
   wherein the second electrical power source is located non-coaxial with a center axis of the transmission system.

2. The pumping system of claim 1, wherein the mechanical power source is an engine.

3. The pumping system of claim 1, wherein at least one of the first electrical power source and the second electrical power source is an electric motor.

4. The pumping system of claim 1, wherein at least one of the first connection apparatus and the second connection apparatus is a chain.

5. The pumping system of claim 1, wherein the pump is located non-coaxial with said center axis of the transmission system.

6. The pumping system of claim 1, wherein the pumping system further comprises a roller clutch associated with at least one of said first connection apparatus and said second connection apparatus.

7. A pump adapted for use in a transmission system of a vehicle, said pump comprising:
   a first electrical power source, said first electrical power source coaxial with a center axis of the transmission system;
   a first functional connection to a mechanical power source, said mechanical power source coaxial with said first electrical power source; and a second functional connection to a second electrical power source, said second electrical power source non-coaxial with said center axis;

wherein said pump is powerable by said mechanical power source independent of said second electrical power source;

wherein said pump is powerable by said second electrical power source independent of said mechanical power source, said pump powerable by said second electrical power source when the vehicle is powered by said first electrical power source;

wherein at least one of the first functional connection and the second functional connection comprises a roller clutch;

wherein said roller clutch prevents said mechanical power source and said second electrical power source from simultaneously powering said pump; and wherein said pump is located non-coaxial with a center axis of the transmission system.

8. The pump of claim 7, wherein the mechanical power source is an engine.

9. The pump of claim 7, wherein at least one of the first electrical power source and the second electrical power source is an electric motor.

10. The pump of claim 7, wherein at least one of the first functional connection and the second functional connection is a chain.

11. A method of pumping fluid in a transmission system of a vehicle having a mechanical power source and a first electrical power source, the method comprising the steps of:

functionally connecting a pump to the mechanical power source;

functionally connecting said pump to a second electrical power source;

providing power to said pump from said mechanical power source when the vehicle is powered by said mechanical power source;

restricting power to said pump from said second electrical power source when the vehicle is powered by said mechanical power source;

providing power to said pump from said second electrical power source when the vehicle is powered by said first electrical power source; and restricting power to said pump from said mechanical power source when the vehicle is powered by said first electrical power source.

12. The method of claim 11 wherein a roller clutch selectively provides or restricts power to the pump from at least one of the mechanical power source and the second electrical power source.

13. The pumping system of claim 1, wherein the first electrical power source is coaxial with said center axis of the transmission system.

14. The pumping system of claim 1, wherein the mechanical power source is coaxial with said center axis of the transmission system.

15. The pumping system of claim 1, wherein said pump is non-coaxial with the second electrical power source.

16. The method of claim 11, wherein said mechanical power source and said first electrical power source are coaxial and said second electrical power source and said pump are non-coaxial in said transmission system when power to said pump from said mechanical power source is being restricted.

17. The pumping system of claim 6, wherein said roller clutch is configured to prevent the mechanical power source and the second electrical power source from simultaneously powering said pump.

18. The pump of claim 7, wherein both the first functional connection and the second functional connection comprise a roller clutch.

* * * * *